United States Patent [19]
Ely

[11] 3,920,108
[45] Nov. 18, 1975

[54] FRICTION DISC MEMBER FOR BRAKE OR CLUTCH

[75] Inventor: William E. Ely, Troy, Ohio

[73] Assignee: The B. F. Goodrich Company, Akron, Ohio

[22] Filed: Aug. 22, 1974

[21] Appl. No.: 499,506

[52] U.S. Cl...... 192/107 R; 188/73.2; 188/218 XL; 188/250 G
[51] Int. Cl.² ................... F16D 13/64; F16D 69/04
[58] Field of Search ........... 188/73.1, 73.2, 218 XL, 188/234, 250 G, 251 R, 251 M, 251 A; 192/107 R, 107 M, 70.14; 219/92, 93, 94

[56] References Cited
UNITED STATES PATENTS

| | | | |
|---|---|---|---|
| 1,493,043 | 5/1924 | Lachman et al. | 219/94 |
| 1,947,894 | 2/1934 | Whitworth | 188/251 R X |
| 2,824,629 | 2/1958 | Wellman | 188/234 |
| 2,938,790 | 5/1960 | Stedman et al. | 188/218 XL |
| 3,027,979 | 4/1962 | Pocock | 188/251 R X |
| 3,605,967 | 9/1971 | Warren et al. | 188/73.2 X |

FOREIGN PATENTS OR APPLICATIONS

| | | | |
|---|---|---|---|
| 569,671 | 1/1959 | Canada | 188/251 R |

Primary Examiner—George E. A. Halvosa
Attorney, Agent, or Firm—W. A. Shira, Jr.

[57] ABSTRACT

An annular rigid disc having a plurality of friction lining segments on a face of said disc for frictional engagement with other brake parts. Each of the lining segments includes friction lining material contained in a cup-like container with a bottom and side flanges. A friction face extends continuously across the cup-like container and the bottom of the container is clamped to the rigid disc as by riveting to the disc or welding to the bottom of another container on the opposite side of the disc.

3 Claims, 4 Drawing Figures

FRICTION DISC MEMBER FOR BRAKE OR CLUTCH

BACKGROUND OF THE INVENTION

This invention relates to disc type brakes or clutches and particularly to annular disc members having relatively thick segmental friction lining cups mounted on relatively thin annular disc carriers. In the past the friction lining cups have been attached to the carrier by riveting which has required the placing of holes in the friction lining material for inserting and upsetting the rivets. The edges of the holes in the friction lining were contained by flanges. This construction not only reduced the area of friction lining material available for braking but also caused an uneven distribution of pressure over the face of the friction lining cups which resulted in uneven and increased wear.

SUMMARY OF THE INVENTION

According to this invention the friction lining cups are attached to the annular disc carriers in such a way that the surface of the friction lining material is continuous from one side to the other. The bottoms of the lining cups have a mating configuration with the disc carrier and are attached in tension by connections under the friction lining material.

The accompanying drawings show one preferred form and a modification of the friction disc member made in accordance with and embodying this invention and which are representative of how the invention may be practiced.

DETAILED DESCRIPTION

Figure 1:
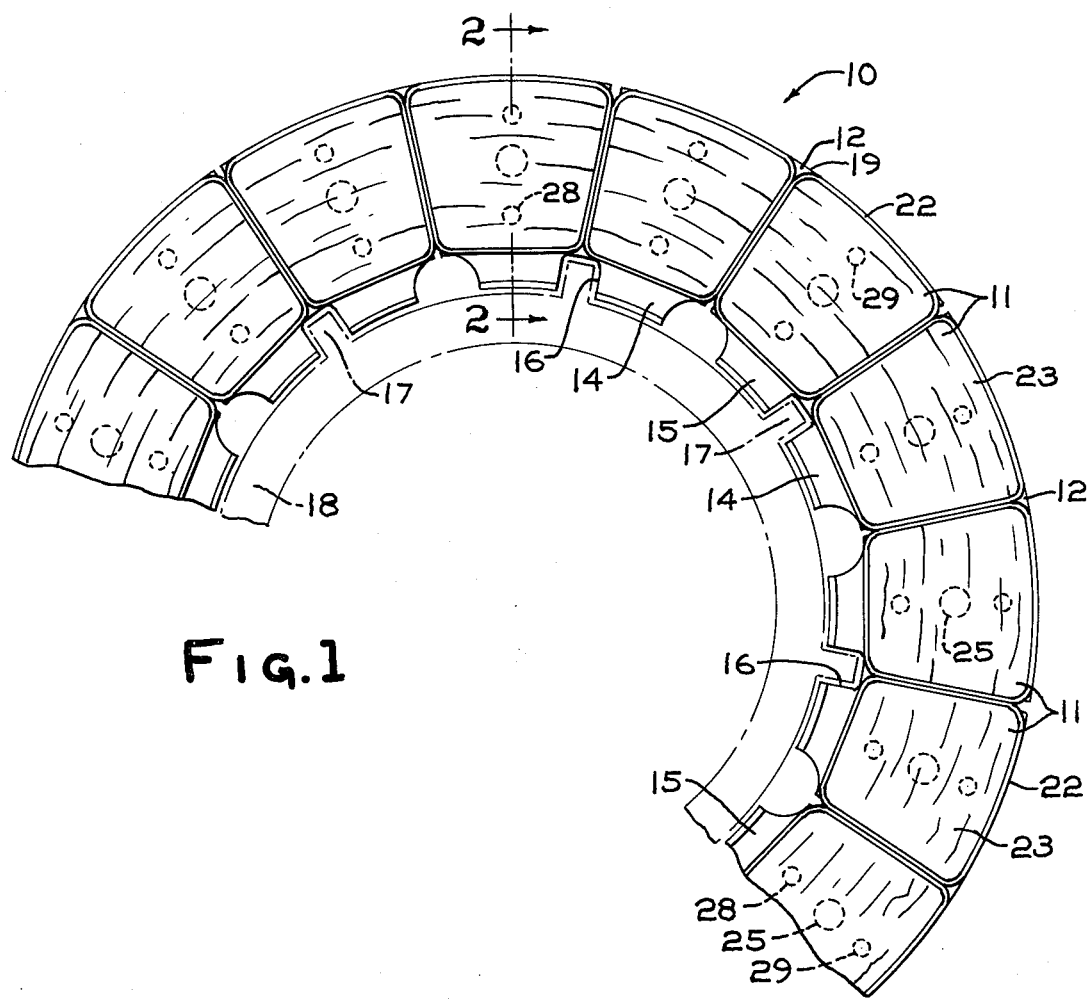
FIG. 1 is a side elevation of a part of an annular disc assembly (shown in solid lines) illustrated in torque driving engagement with a related part which in this example may be a splined torque tube, the sides of which are represented by the chain dotted lines.

Referring to FIG. 1 a friction member 10 for a disc brake assembly is shown which has a plurality of friction lining segments or lining cups 11 mounted on opposing faces 12 and 13 of an annular rigid disc member or carrier 14. The construction of this invention may be adapted for use as a rotor or stator and in the present embodiment the inner periphery 15 of the carrier 14 has spaced-apart axially extending grooves 16 for engagement with mating interfitting splines 17 of an associated torque tube 18 which is represented in chain dotted lines. When this invention is applied to a rotor the axially extending grooves may be provided in the outer periphery 19 for engagement with interfitting ribs on a wheel.

Each of the lining cups 11 has a bottom plate 20 with peripheral side flanges 22 which may be of steel for retaining a body 23 of friction lining material. The body 23 of friction lining material may be of any one of a number of materials well known in the art of which sintered metallic friction lining material is one.

Figure 2:
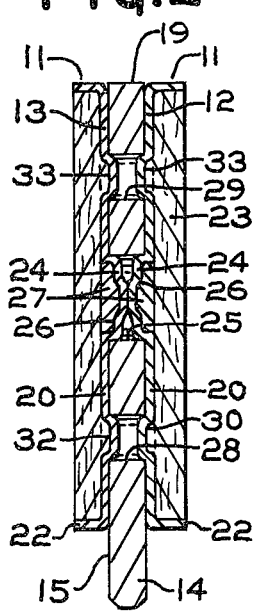
FIG. 2 is an enlarged sectional view taken along the plane of line 2—2 of FIG. 1.
Figure 3:
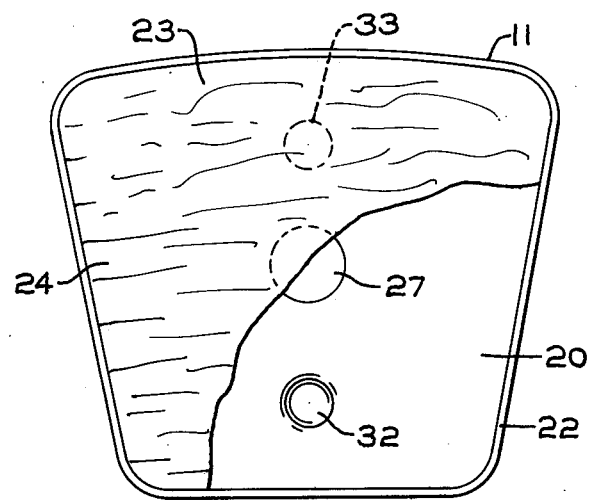
FIG. 3 is an enlarged side elevational view of one of the friction lining segments with part of the friction lining cut away to show the bottom plate.

As shown in FIGS. 2 and 3 each of the lining cups 11 has a bottom plate 20 with a central projection 24 extending into a central opening 25 in the carrier 14. The central projection 24 forms a recess 26 under the body 23 of friction lining material and a spacer 27 of metal or other heat absorbing material is placed in this recess before the body 23 of friction lining material is placed in the cup 11. Additional openings 28 and 29 are located in the carrier 14 at positions radially inward and radially outward respectively of each of the central openings 25. The bottom plate 20 of each of the lining cups 11 has additional projections 32 and 33 radially inward and radially outward respectively of the central opening 25 for receiving the projections 32 and 33 in mating engagement as shown in FIG. 2.

The friction member 10 is assembled by placing a pair of the lining cups 11 in alignment on abutting opposite faces 12 and 13 of the carrier 14. The central projections 24 extend into the central opening 25 with the central projection 24 of one lining cup contacting the central projection of the other lining cup so that a clearance exists between the lining cups and the carrier. Welding electrodes are placed on the surfaces of the bodies 23 of friction lining material in alignment with the central projections 24.

A force normal to the surfaces of the bodies 23 of friction lining material is exerted through the electrodes and voltage and current applied. As the weld is formed the projections 24 are deformed until the two lining cups 11 are in full contact with the lining carrier 14. This process is repeated for each pair of lining cups 11 until the assembly is completed. As shown in the drawings the additional projections 32 and 33 radially inward and outward of the central projections 24 fit in the additional openings 28 and 29 to resist rotational movement of the lining cups 11.

Figure 4:
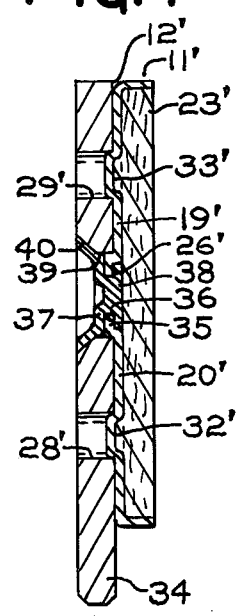
FIG. 4 is a sectional view like FIG. 2 of a modification in which the friction lining segments are mounted on only one side of an end pressure plate.

Referring to FIG. 4 a modification is shown in which a lining cup 11' is mounted on an end pressure plate 34. In this modification a central projection 35 in the bottom plate 20' of each of the lining cups 11' has a hole 36 through which a rivet 37 extends. The head 38 of the rivet 37 is located in a recess 26' within the projection 35 and under the body 23 of friction lining material. The central projection 35 extends into a central opening 39 in the pressure plate 34 which has a beveled edge 40 against which the lip of the hollow portion of rivet 37 may be spun during assembly of the friction lining member. Each of the lining cups 11' also has additional projections 32' and 33' extending into additional openings 28' and 29' in the pressure plate 34 for resisting rotation of the lining cups 11'. In assembly of the friction member the lining cup 11' is mounted on a face 12' of the pressure plate 34 with the rivet 37 extending through the central opening 39. The projections 32' and 33' are also in alignment with the openings 28' and 29' in the pressure plate 34. The rivet 37 which is hollow is then spun so that the edges are pressed against the beveled edge 40 of the central opening 39 and the bottom plate 20' is pulled into engagement with the face 12' of the pressure plate 34.

In the modification in FIGS. 1, 2 and 3 and in the modification shown in FIG. 4 the lining cups 11 and 11' are pulled into engagement with the faces 12, 13 and 12' of the carrier 14 and pressure plate 34 respectively providing a tension connection. To remove the lining cups 11 and 11', the central projections 24 and 35 may be drilled or punched out or the connection removed by driving a wedge or chisel between the cups and carrier or pressure plate. New linng cups may then be installed in the same manner as described hereinabove.

The superiority of the construction of friction member 10 has been demonstrated in tests in which the wear of friction members having holes in the friction lining material for riveting the lining cups to the carrier have been compared with the wear of the friction member built in accordance with the present invention and having a continuous friction lining surface extending from the side flange 22 at one edge to the side flange at the opposite edge. The hole for the rivet in each of the lining cups has heretofore reduced the total lining area by approximately six percent. It was found in comparative wear tests that although the friction member 10 of this invention only had six percent greater friction lining surface the wear rate was reduced by close to twenty-five percent as compared to the wear rate of friction members having rivet holes.

While certain representative embodiments and details have been shown for the purpose of illustrating the invention it will be apparent to those skilled in the art that various changes and other modifications may be made therein without departing from the spirit and scope of the invention.

I claim:

1. A friction member for a brake or clutch comprising an annular rigid disc member, said disc member having two opposite faces, a plurality of friction lining segments positioned at circumferentially spaced-apart positions on both said faces of said disc member with the friction lining segments on one of said faces being in alignment with the friction lining segments on the other of said faces, each of said lining segments including a bottom plate, peripheral side flanges and a body of friction lining material contained by said bottom plate and side flanges with a friction face extending continuously between said peripheral side flanges, an opening in said disc member under each of said friction lining segments, said bottom plate of each of said segments having a projection extending into said opening, said projection of a first segment on one face of the disc member being welded to said projection of a second segment on the opposite face of said disc member for clamping said bottom plate of each of said segments to a respective face on said disc member.

2. A friction member according to claim 1 wherein said projection in said bottom plate of each of said segments is deformed during welding so that said bottom plate is in full contact with the respective face of said disc member.

3. A friction member according to claim 1 wherein said projection extending into said opening provides a recess in said bottom plate, and a spacer member of heat absorbing material disposed in said recess and under said body of friction lining material of each of said segments.

* * * * *